United States Patent
Ota et al.

(10) Patent No.: US 9,652,886 B2
(45) Date of Patent: May 16, 2017

(54) RENDERING PROCESSING DEVICE AND RENDERING PROCESSING METHOD USING INTERPOLATION RENDERING RESULT

(71) Applicant: Sony Computer Entertainment Inc., Tokyo (JP)

(72) Inventors: Osamu Ota, Tokyo (JP); Yasunari Hatasawa, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 224 days.

(21) Appl. No.: 14/168,656

(22) Filed: Jan. 30, 2014

(65) Prior Publication Data

US 2014/0218367 A1 Aug. 7, 2014

(30) Foreign Application Priority Data

Feb. 7, 2013 (JP) ................. 2013-022652

(51) Int. Cl.
*G06T 15/20* (2011.01)
*G06T 13/80* (2011.01)
(Continued)

(52) U.S. Cl.
CPC .............. *G06T 15/20* (2013.01); *G06T 13/80* (2013.01); *G06T 15/005* (2013.01); *G09G 5/363* (2013.01);
(Continued)

(58) Field of Classification Search
USPC ........................................................ 345/427
See application file for complete search history.

(56) References Cited

U.S. PATENT DOCUMENTS 6,326,964 B1 * 12/2001 Snyder .................. G06T 11/001
345/419
6,563,497 B1 * 5/2003 Ebihara .................. H04N 5/275
345/419
(Continued)

FOREIGN PATENT DOCUMENTS

JP 01241679 A 9/1989
JP 05101160 A 4/1993
(Continued)

OTHER PUBLICATIONS

Office Action for corresponding JP Patent Application No. 2013-022652, 8 pages, dated Sep. 13, 2016.

*Primary Examiner* — Maurice L McDowell, Jr.
(74) *Attorney, Agent, or Firm* — Matthew B. Dernier, Esq.

(57) ABSTRACT

A rendering processing device includes: a rendering processing section configured to generate a vertex calculation result of an object on a basis of a rendering command, perform a rendering process on a basis of the vertex calculation result of each object, and store a rendering result in a rendering buffer; and a rendering command interpolating section configured to generate an interpolated vertex calculation result of each object on a basis of set values of rendering commands and vertex calculation results of each object at two different times. The rendering processing section performs the rendering process on a basis of the interpolated vertex calculation result, and stores an interpolated rendering result in the rendering buffer.

13 Claims, 12 Drawing Sheets

(51) Int. Cl.
*G06T 15/00* (2011.01)
*G09G 5/36* (2006.01)

(52) U.S. Cl.
CPC ............ *G09G 2320/106* (2013.01); *G09G 2340/0435* (2013.01)

(56) References Cited

U.S. PATENT DOCUMENTS

| | | | | |
|---|---|---|---|---|
| 6,661,424 B1* | 12/2003 | Alcorn | ............ | G06T 15/005 345/581 |
| 7,218,291 B2 | 5/2007 | Abdalla | | |
| 8,269,782 B2 | 9/2012 | Washizu | | |
| 8,711,152 B2 | 4/2014 | Masuda | | |
| 2004/0012563 A1* | 1/2004 | Papakipos | ............ | G06T 15/005 345/157 |
| 2004/0165776 A1* | 8/2004 | Brouwer | ............ | G06T 17/00 382/181 |
| 2005/0030316 A1* | 2/2005 | Sirtori | ............ | G06T 15/005 345/546 |
| 2006/0055695 A1* | 3/2006 | Abdalla | ............ | G06T 11/40 345/426 |
| 2008/0007559 A1* | 1/2008 | Kalaiah | ............ | H04N 13/0275 345/501 |
| 2008/0278509 A1 | 11/2008 | Washizu | | |
| 2010/0188404 A1* | 7/2010 | Tong | ............ | G06T 11/40 345/426 |
| 2012/0147013 A1* | 6/2012 | Masuda | ............ | G06T 13/80 345/473 |

FOREIGN PATENT DOCUMENTS

| | | |
|---|---|---|
| JP | 2000172865 A | 6/2000 |
| JP | 2002042159 A | 2/2002 |
| JP | 2003303352 A | 10/2003 |
| JP | 2004159354 A | 6/2004 |
| JP | 2006050070 A | 2/2006 |
| JP | 2008512771 A | 4/2008 |
| JP | 2008123520 A | 5/2008 |
| JP | 201139828 A | 2/2011 |
| JP | 2011215724 A | 10/2011 |
| WO | 2011158446 A1 | 12/2011 |

* cited by examiner

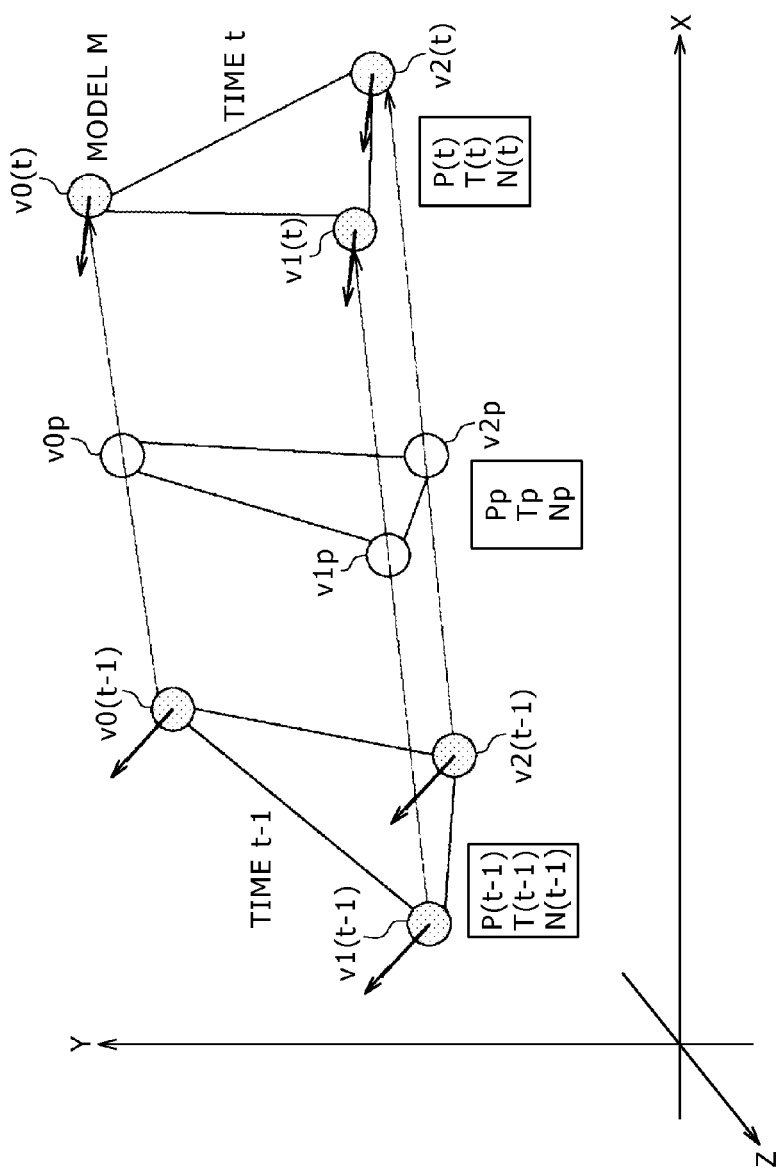

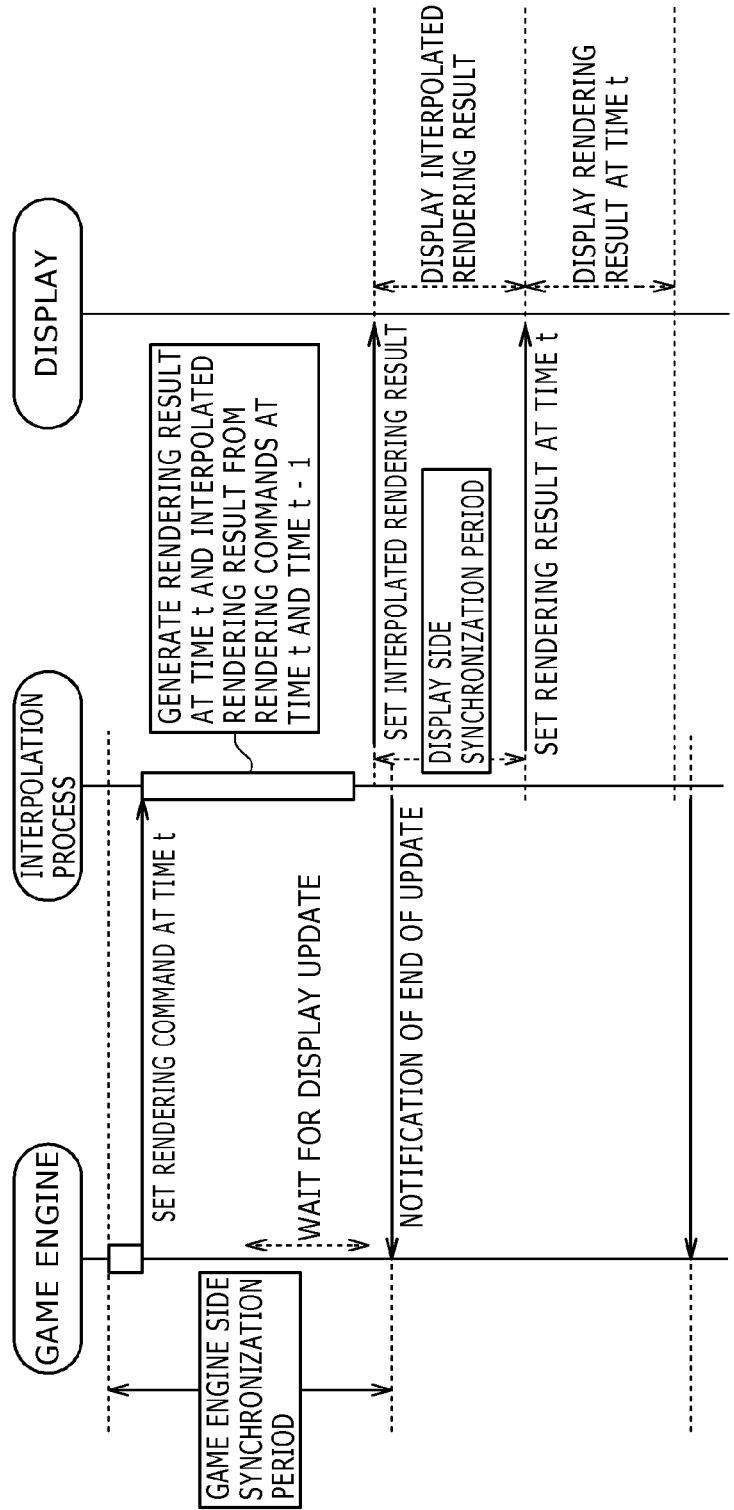

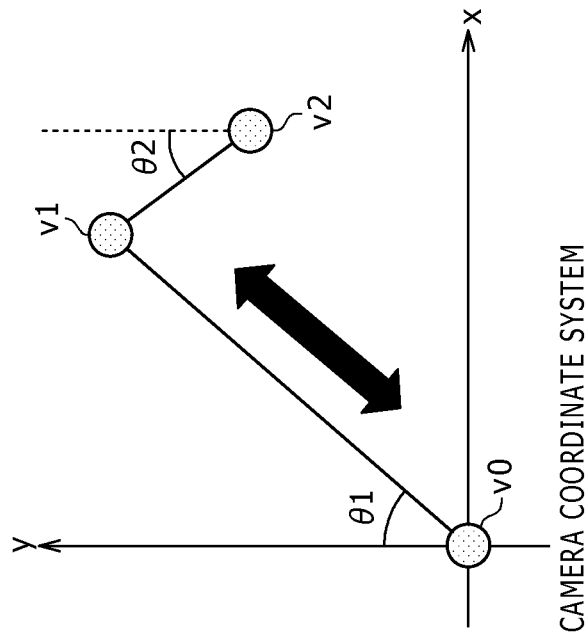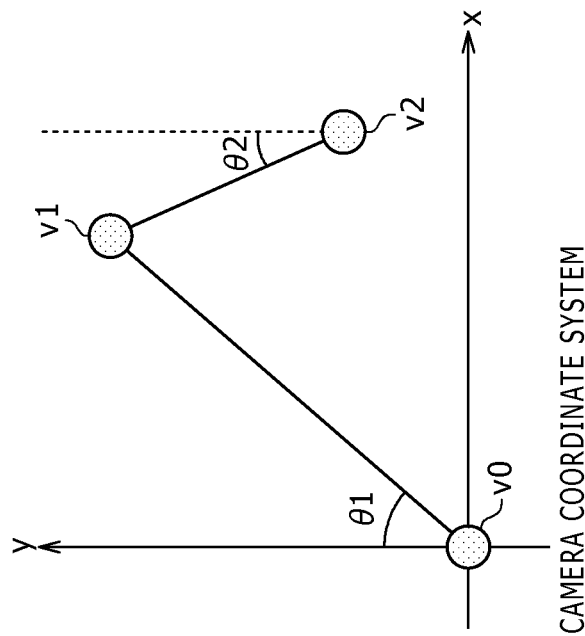

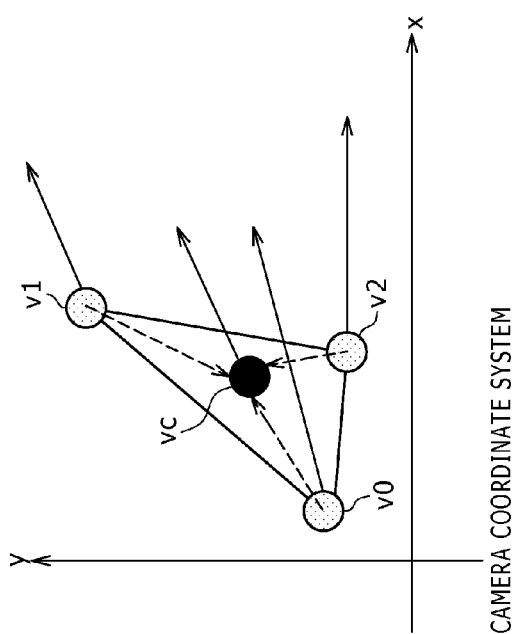
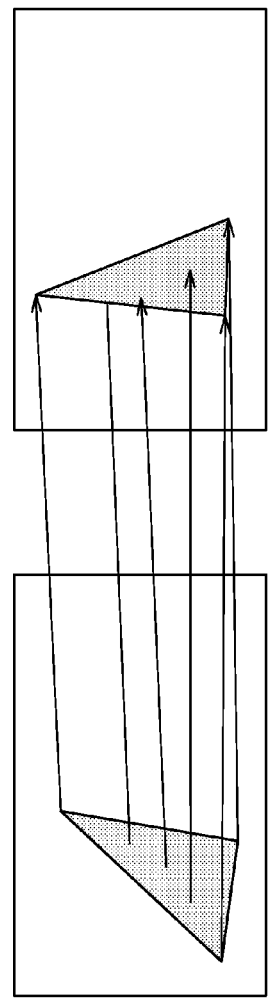
FIG.10A
FIG.10B  FIG.10C

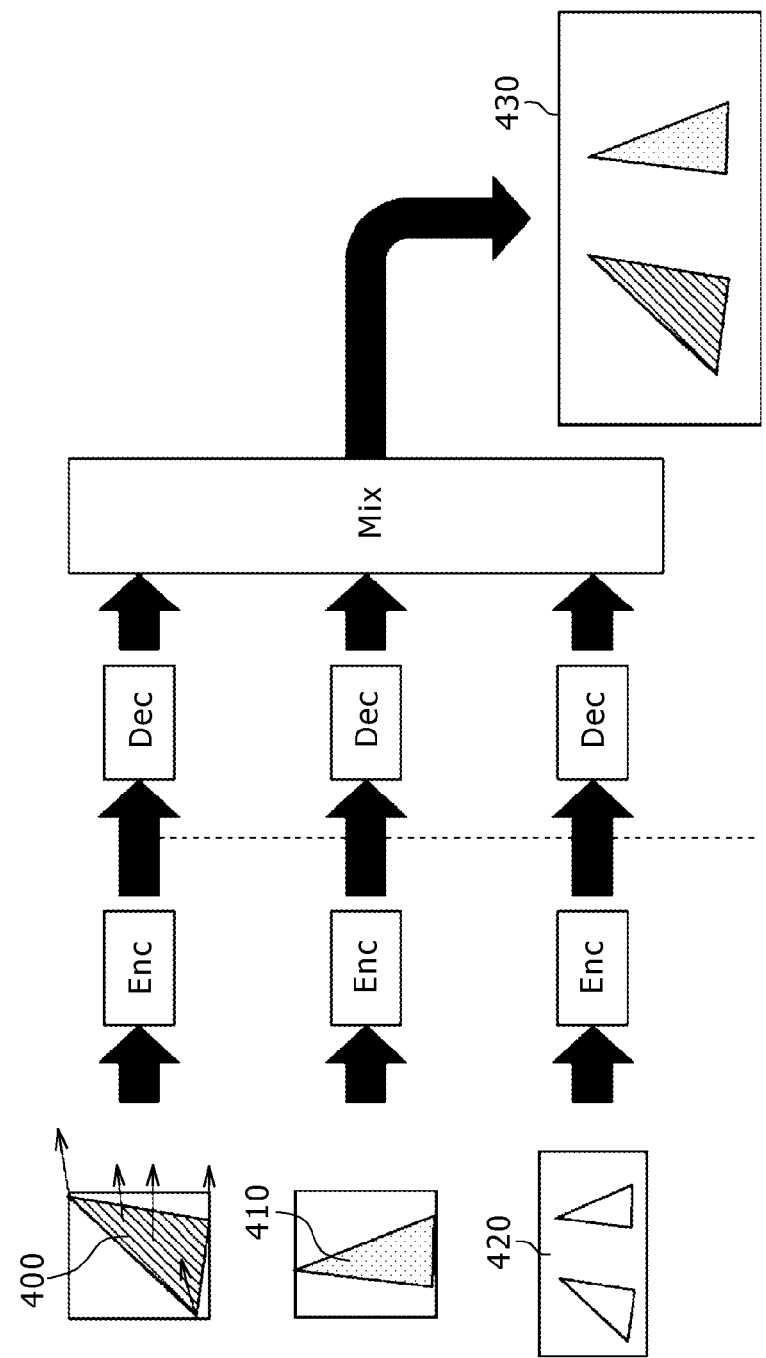

RENDERING PROCESSING DEVICE AND RENDERING PROCESSING METHOD USING INTERPOLATION RENDERING RESULT

BACKGROUND

The present technology relates to a rendering processing technology, and particularly to a technology for generating rendering commands.

The use of high-quality graphics has spread, with personal computers and dedicated game machines executing applications such as games, simulations, and the like using high-quality three-dimensional computer graphics and reproducing video contents in which photographs taken from life and computer graphics are combined with each other, for example.

In general, graphics processing is performed by cooperation of a CPU and a graphics processing unit (GPU). The CPU is a general-purpose processor that performs general-purpose operations, whereas the GPU is a dedicated processor for performing advanced graphics operations. The CPU performs geometry operations such as projection transformation and the like on the basis of the three-dimensional model of an object, and the GPU receives vertex data and the like from the CPU and performs rendering. The GPU includes specialized hardware such as a rasterizer, a pixel shader, and the like, and executes the graphics processing by pipelining. Some of the latest GPUs have a programmable shader function, which is referred to as a program shader. A graphics library is generally provided to support shader programming.

When an object is rendered, the CPU needs to sequentially generate graphics commands to be executed by the hardware of the GPU, and pass the graphics commands to the GPU.

In connection with the related art, the reader is requested to refer to Japanese Patent Laid-Open No. 2008-123520.

SUMMARY

The graphics processing capability of the GPU is enhanced, thus enabling moving images to be generated at a higher frame rate than a frame rate in the past. However, in an application such as a game or the like, a game engine generates graphics commands at predetermined time intervals assumed in advance, and passes the graphics commands to the GPU. Even when the GPU has sufficient graphics performance, the game engine in the game application made in advance specifies graphics commands at time intervals adjusted to the frame rate in the past, so that graphics cannot be generated at a high frame rate.

An image-based HFR (High Frame Rate) technology may be used to generate moving images having a high frame rate. However, this method obtains a motion vector by block matching or the like between a plurality of frames, and interpolates pixels, so that an amount of operation is increased. In addition, problems tend to occur in image quality of an interpolated frame, including a problem that an image quality degradation such as a halo or the like tends to occur at an object boundary part. Further, the frame interpolation cannot deal with the occlusion of an object.

In addition, for a game application that generates a two-dimensional game image, a virtual viewpoint generating technology is also used which converts the two-dimensional game image to a three-dimensional game image by virtually setting a viewpoint. However, this method only changes viewpoint information, and cannot represent the motion of individual objects, so that the motion of the objects becomes discontinuous.

The present technology has been created in view of such problems. It is desirable to provide a technology that can improve efficiency of execution of graphics commands generated from intermediate commands.

According to an embodiment of the present technology, there is provided a graphics command generating device including: an intermediate command generating section configured to generate an intermediate command as an intermediate rendering command having model data for rendering an object; and a graphics command converting section configured to convert the generated intermediate command to a graphics command sequence for making a graphics processor execute the generated intermediate command. The graphics command converting section includes an identity determining section configured to determine whether a state of a graphics command to be generated from the intermediate command is identical with a state of a previously generated graphics command, and a graphics command generating section configured to generate the graphics command whose state is determined not to be identical by the identity determining section, and treat the graphics command whose state is determined to be identical as a redundant command and not generating the command.

According to another embodiment of the present technology, there is provided a graphics command generating method. This method includes: generating an intermediate command as an intermediate rendering command having model data for rendering an object; and converting the generated intermediate command to a graphics command sequence for making a graphics processor execute the generated intermediate command. Converting the generated intermediate command to the graphics command sequence for making the graphics processor execute the generated intermediate command includes determining whether a state of a graphics command to be generated from the intermediate command is identical with a state of a previously generated graphics command, and generating the graphics command whose state is determined not to be identical, and treating the graphics command whose state is determined to be identical as a redundant command and not generating the command.

It is to be noted that arbitrary combinations of the above-described constituent elements and methods, devices, systems, computer programs, data structures, recording media, and the like to which expressions of the present technology are converted are also effective as embodiments of the present technology.

According to the present technology, it is possible to improve efficiency of execution of graphics commands generated from intermediate commands.

BRIEF DESCRIPTION OF THE DRAWINGS

FIG. 7 is a diagram of assistance in explaining details of a vertex interpolating process;

FIG. 8 is a diagram of assistance in explaining display timing;

FIGS. 9A and 9B are diagrams of assistance in explaining a post antialiasing filter adaptive control process;

FIGS. 10A, 10B, and 10C are diagrams of assistance in explaining a pixel-based frame interpolating process;

FIG. 12 is a diagram of assistance in explaining an encoding process for each object.

DETAILED DESCRIPTION OF THE PREFERRED EMBODIMENT

Figure 1:
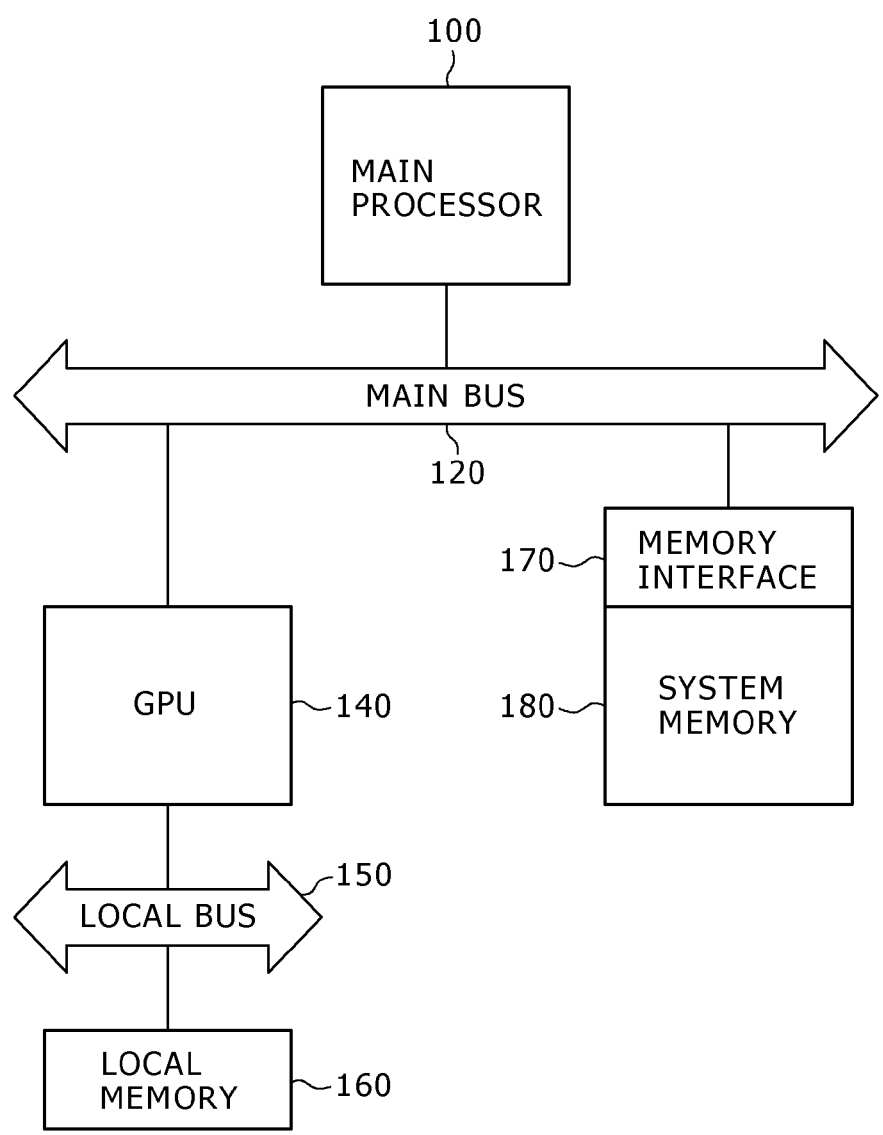
FIG. 1 is a block diagram of a graphics processing system according to an embodiment.

FIG. 1 is a block diagram of a graphics processing system according to an embodiment. This graphics processing system includes a main processor 100, a graphics processing unit 140, a system memory 180, and a local memory 160.

The main processor 100 may be a single main processor, may be a multiprocessor system including a plurality of processors, or may be a multi-core processor having a plurality of processor cores integrated in one package. The main processor 100 is connected to a main bus 120. The system memory 180 is connected to the main bus 120 via a memory interface 170. The main processor 100 can write and read data to and from the system memory 180 via the main bus 120.

The graphics processing unit (hereinafter referred to simply as a "GPU") 140 is a graphics chip having a graphics processor core mounted thereon. The GPU 140 can write and read data to and from the local memory 160 via a local bus 150.

The main processor 100 and the GPU 140 are connected to each other by the main bus 120. The main processor 100 and the GPU 140 can exchange data with each other via the main bus 120.

The main processor 100 generates rendering commands for rendering an object, and queues the rendering commands in a command buffer provided within the system memory 180. The GPU 140 sequentially reads and processes the rendering commands accumulated in the command buffer.

The main processor 100 generates geometry data such as vertex coordinate values, vertex color, normal vectors, UV values, and the like of a polygon on the basis of a three-dimensional model of the object, and stores the geometry data in the system memory 180. In addition, the main processor 100 stores a texture to be mapped to the surface of the polygon in the system memory 180. Further, the main processor 100 reads a shader program from a recording medium such as a hard disk or the like, and stores the shader program in the system memory 180.

The memory area of the system memory 180 is memory-mapped to an address space referred to by the GPU 140 so as to be able to be accessed also from the GPU 140. The GPU 140 can therefore read programs and data from the system memory 180. For example, the GPU 140 can read the geometry data, the texture, and the shader program from the system memory 180, and store data necessary for graphics operation such as the read geometry data, the read texture, and the like in the local memory 160.

The GPU 140 generates rasterized data of the polygon using the geometry data according to the shader program, and writes the pixel data to a frame buffer within the local memory 160. Further, the GPU 140 maps the texture to the surface of the polygon, and writes pixel data after the texture mapping to the frame buffer.

Figure 2:
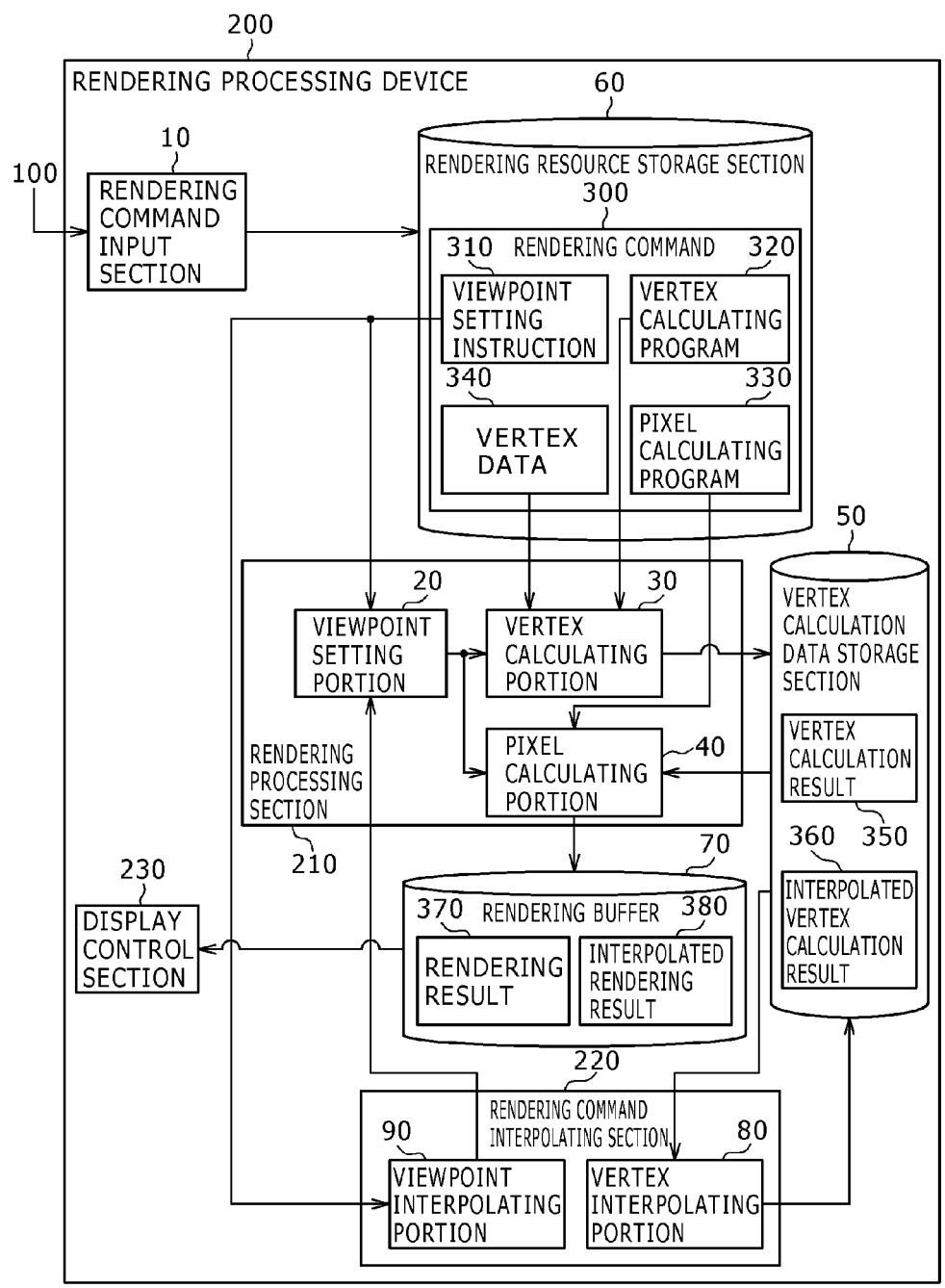
FIG. 2 is a block diagram of a rendering processing device according to the embodiment.

FIG. 2 is a block diagram of a rendering processing device 200 according to the embodiment. Functional blocks of the rendering processing device 200 are implemented by cooperation of the GPU 140 and the local memory 160 shown in FIG. 1 and software loaded in the local memory 160. These functional blocks can be implemented in various forms by only hardware, only software, or a combination thereof.

The rendering processing device 200 includes a rendering command input section 10, a rendering resource storage section 60, a rendering processing section 210, a vertex calculation data storage section 50, a rendering buffer 70, a rendering command interpolating section 220, and a display control section 230.

The rendering command input section 10 receives a rendering command 300 from a game engine executed by the main processor 100, and retains the rendering command 300 in the rendering resource storage section 60.

The rendering processing section 210 reads the rendering command 300 from the rendering resource storage section 60, performs rendering by executing the rendering command 300, and stores a rendering result 370 in the rendering buffer 70.

A configuration of the rendering processing section 210 will be described in more detail. The rendering processing section 210 includes a viewpoint setting portion 20, a vertex calculating portion 30, and a pixel calculating portion 40. The rendering command 300 includes a viewpoint setting instruction 310, a vertex calculating program 320, a pixel calculating program 330, and vertex data 340.

The viewpoint setting portion 20 sets a viewpoint in the vertex calculating portion 30 and the pixel calculating portion 40 on the basis of the viewpoint setting instruction 310.

The vertex calculating portion 30 calculates vertex parameters such as a vertex position, a texture position, a normal vector, and the like from the vertex data 340 of each object on the basis of the viewpoint set by the viewpoint setting portion 20 by using the vertex calculating program 320. The vertex calculating portion 30 stores the vertex parameters as a vertex calculation result 350 in the vertex calculation data storage section 50.

The pixel calculating portion 40 calculates pixels from the vertex calculation result 350 of each object on the basis of the viewpoint set by the viewpoint setting portion 20 by using the pixel calculating program 330. The pixel calculating portion 40 stores the pixels as a rendering result 370 in the rendering buffer 70.

The rendering command interpolating section 220 interpolates a vertex by applying interpolation to rendering commands 300 at two different times which rendering commands 300 are retained by the rendering command input section 10 in the rendering resource storage section 60 using the set values of the rendering commands 300 and vertex calculation results. The rendering command interpolating section 220 retains the vertex as an interpolated vertex calculation result 360 in the vertex calculation data storage section 50.

A configuration of the rendering command interpolating section 220 will be described in more detail. The rendering command interpolating section 220 includes a viewpoint interpolating portion 90 and a vertex interpolating portion 80.

The viewpoint interpolating portion 90 reads viewpoint setting instructions 310 at two different times from the rendering resource storage section 60, applies interpolation to viewpoints at the two different times, and supplies an interpolated viewpoint to the viewpoint setting portion 20. The viewpoint setting portion 20 sets the interpolated viewpoint in the pixel calculating portion 40.

The vertex interpolating portion 80 reads vertex calculation results 350 at the two different times from the vertex calculation data storage section 50, applies interpolation to the vertex calculation results at the two different times, and retains a vertex calculation result obtained by the interpolation as an interpolated vertex calculation result 360 in the vertex calculation data storage section 50.

The pixel calculating portion 40 calculates pixels from the interpolated vertex calculation result 360 of each object on the basis of the interpolated viewpoint by using the pixel calculating program 330 included in the rendering command 300. The pixel calculating portion 40 stores the interpolated rendering result 380 in the rendering buffer 70.

The display control section 230 alternately displays, on a display, the rendering result 370 and the interpolated rendering result 380 that are stored in the rendering buffer 70 while synchronizing the rendering result 370 and the interpolated rendering result 380 with display timing.

Figure 3:
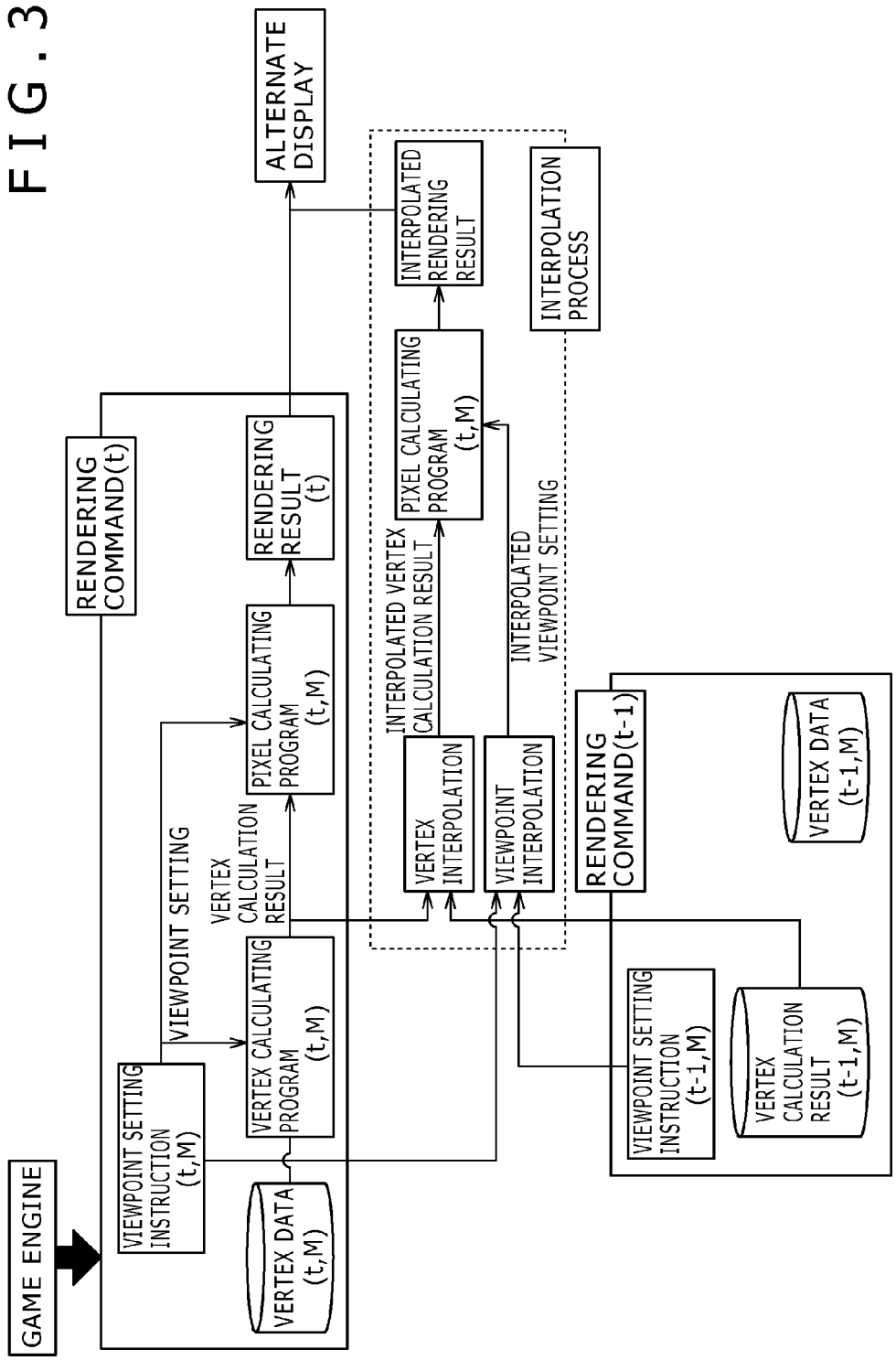
FIG. 3 is a diagram showing a flow of a rendering process by the rendering processing device of FIG. 2.

FIG. 3 is a diagram showing a flow of a rendering process by the rendering processing device 200 of FIG. 2.

The game engine sequentially sets a rendering command (t) at a certain time t. The rendering command includes a viewpoint setting instruction (t, M), a vertex calculating program (t, M), a pixel calculating program (t, M), and vertex data (t, M) of each model M (M is a model number).

(1) A viewpoint is set to the vertex calculating program (t, M) and the pixel calculating program (t, M) on the basis of the viewpoint setting instruction (t, M).

(2) The vertex calculating program (t, M) and the vertex data (t, M) are tied to each other by the rendering command (t). The vertex calculating program (t, M) generates a vertex calculation result from the vertex data (t, M) on the basis of the viewpoint set according to the viewpoint setting instruction (t, M).

(3) The pixel calculating program (t, M) generates a rendering result (t) from the vertex calculation result on the basis of the viewpoint set according to the viewpoint setting instruction (t, M).

In this manner, the normal rendering result (t) at time t is first generated on the basis of the rendering command (t).

(4) Thereafter, an interpolated viewpoint to be used in interpolated rendering is generated by applying interpolation to viewpoints at two times, that is, time t and previous time t–1 on the basis of a viewpoint setting instruction (t–1, M) included in a stored rendering command (t–1) at time t–1 and the viewpoint setting instruction (t, M) specified at time t. The interpolated viewpoint is set in the pixel calculating program (t, M) at time t.

(5) In addition, an interpolated vertex calculation result is generated by applying interpolation to vertexes at the two times t and t–1 on the basis of a stored vertex calculation result (t–1, M) at the previous time t–1 and the vertex calculation result (t, M) at time t. The interpolated vertex calculation result is input to the pixel calculating program (t, M) at time t.

(6) The pixel calculating program (t, M) at time t generates an interpolated rendering result from the interpolated vertex calculation result on the basis of the set interpolated viewpoint.

The above-described process of (1) to (6) is performed on all models M included in the rendering command at time t, whereby a final rendering result (t) and a final interpolated rendering result are obtained.

The interpolated rendering result can be displayed between the two different times, that is, time t–1 and time t, by alternately displaying the rendering result (t) and the interpolated rendering result.

Figure 4:
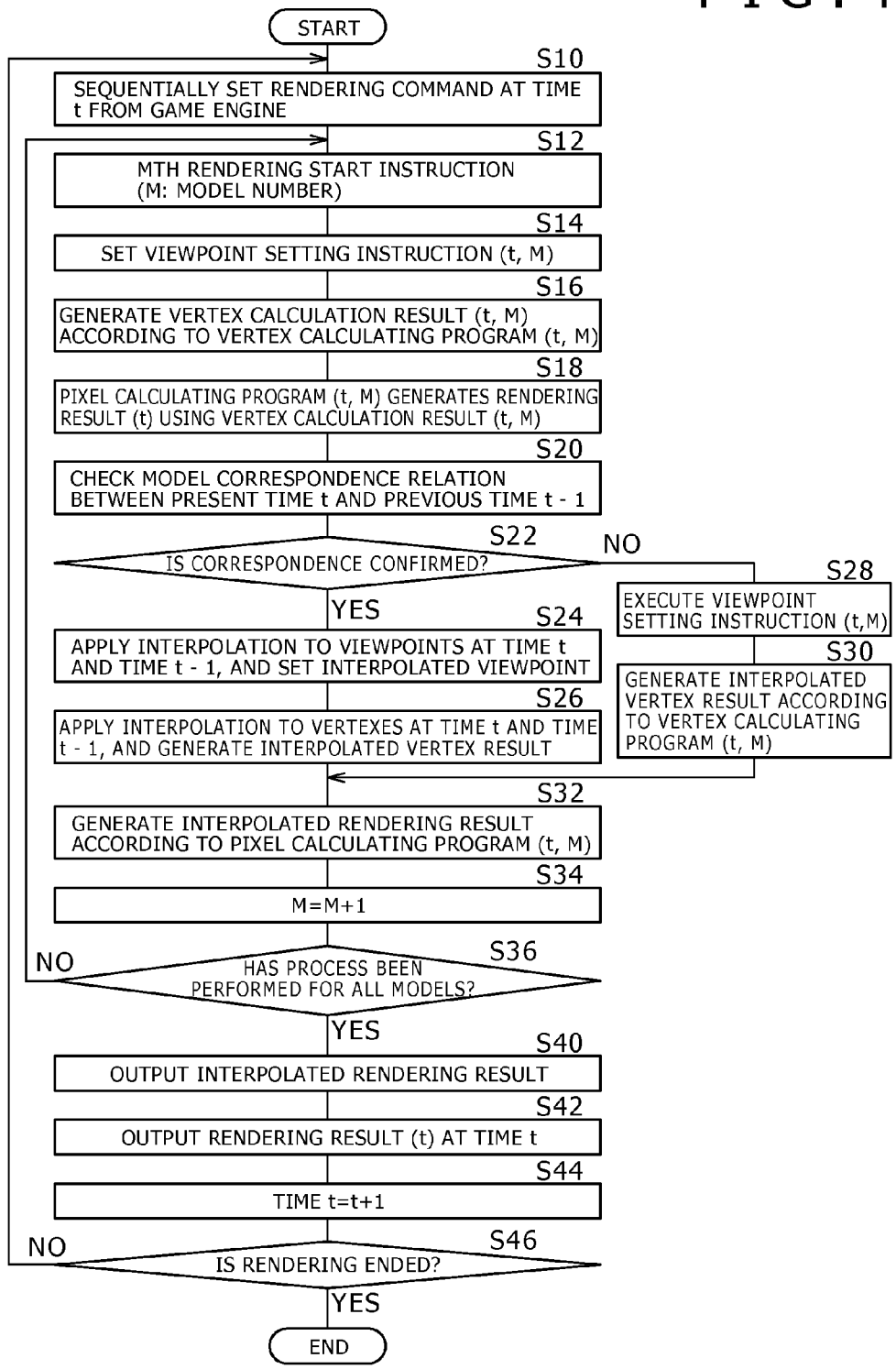
FIG. 4 is a flowchart of a procedure of a rendering command interpolating process by the rendering processing device according to the embodiment.

FIG. 4 is a flowchart of a procedure of a rendering command interpolating process by the rendering processing device 200 according to the embodiment. Description will be made while referring to FIGS. 5 to 7.

The rendering command input section 10 sequentially sets a rendering command at time t which rendering command is input from the game engine (S10). An Mth (M is a model number) rendering start instruction is executed (S12).

Figure 5:
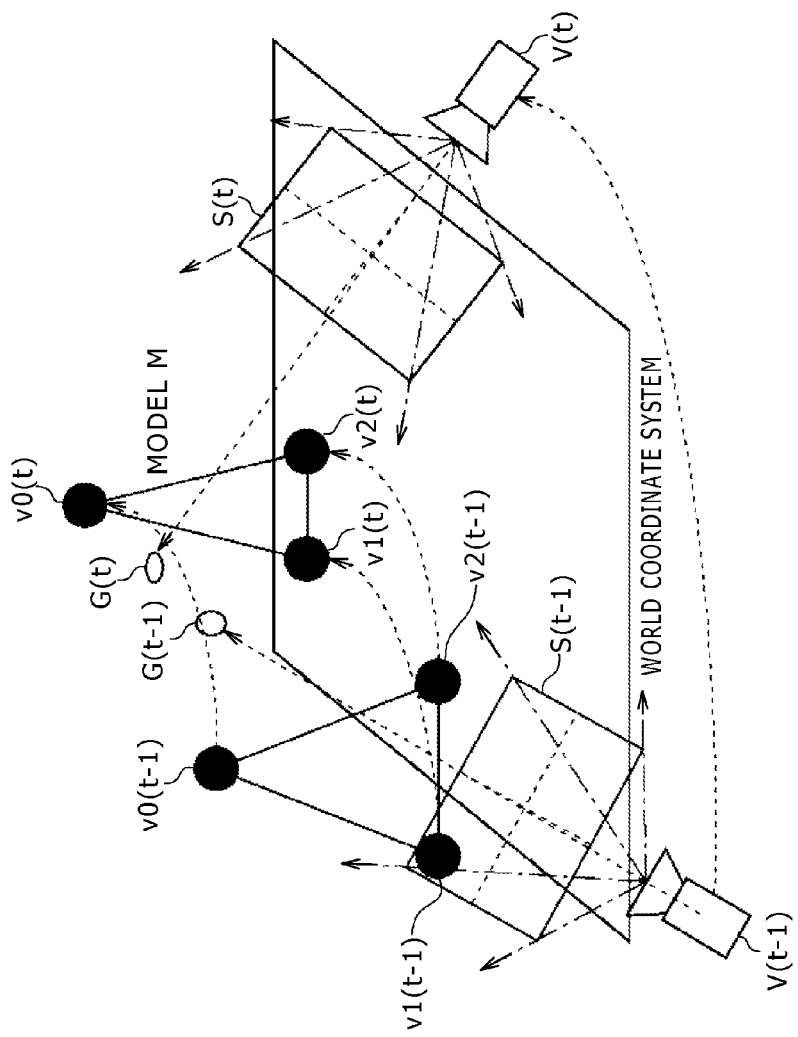
FIG. 5 is a diagram of assistance in explaining the movement of a model, a viewpoint, a gazing point, and a rendering range.

FIG. 5 is a diagram of assistance in explaining the movement of a model, a viewpoint, a gazing point, and a rendering range. FIG. 5 shows, in a world coordinate system, positional relation between a viewpoint V(t), a rendering range S(t), a gazing point G(t), and vertexes v0(t), v1(t), and v2(t) of a model M at a present time t and a viewpoint V(t–1), a rendering range S(t–1), a gazing point G(t–1), and vertexes v0(t–1), v1(t–1), and v2(t–1) of the model M at a previous time t–1.

The viewpoint setting portion 20 sets a viewpoint setting instruction (t, M) (S14). The viewpoint V(t) at time t is thereby set. The vertex calculating portion 30 generates a vertex calculation result (t, M) of the model M at time t by using a vertex calculating program (t, M) (S16). The values of vertex coordinates, texture coordinates, and a normal vector of each vertex of the model M at time t are thereby generated.

The pixel calculating portion 40 generates a pixel result (t) based on the vertex calculation result (t, M) by using a pixel calculating program (t, M) (S18). The rendering result of the model M as viewed from the viewpoint V(t) at time t is thereby generated.

Model correspondence relation between the present time t and the previous time t–1 is checked (S20). Instructions for all models are collected in the rendering command. The instructions relating to each model M need to be extracted from the rendering command (t) at time t. For this, it suffices to associate one segment from a certain rendering start instruction to a next rendering start instruction with one model. The model correspondence between the present time t and the previous time t–1 is determined on the basis of whether the setting order of the rendering command at the present time t is equal to that at the previous time t–1, whether the number of vertexes and size in the vertex data used to derive a vertex calculation result at the present time t are equal to those at the previous time t –1, and whether the number of vertexes of the vertex result itself at the present time t is equal to that at the previous time t–1. This correspondence is used in viewpoint interpolation and vertex interpolation.

When the model correspondence between the present time t and the previous time t–1 is confirmed (Y in S22), the viewpoint interpolating portion 90 interpolates a viewpoint between the present time t and the previous time t–1. The viewpoint setting portion 20 sets the interpolated viewpoint in the vertex calculating portion 30 and the pixel calculating portion 40.

Figure 6:
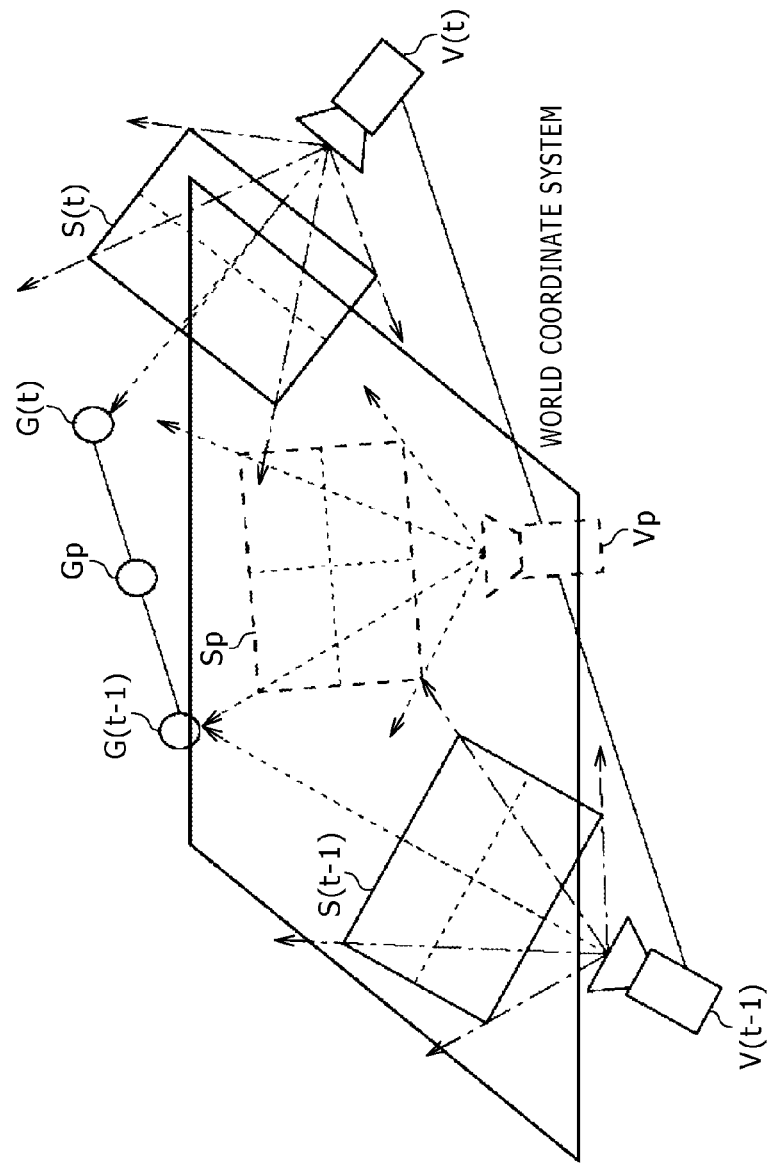
FIG. 6 is a diagram of assistance in explaining details of a viewpoint interpolating process.

FIG. 6 is a diagram of assistance in explaining details of a viewpoint interpolating process. The viewpoint interpolating process interpolates a viewpoint position, a gazing point position, and a rendering range. The viewpoint position, the gazing point position, and the rendering range are obtained as a command argument by graphics commands such as gluLookAt( ) glviewport( ) and the like specified from the game engine. An interpolated value is obtained for each of the viewpoint position, the gazing point position, and the rendering range by applying interpolation to setting information values at the previous time t−1 and the present time t.

Specifically, the set value of an interpolated viewpoint position Vp is obtained by calculating an average value of the setting information values of the viewpoint V(t) at the present time t and the viewpoint V(t−1) at the previous time t−1. Similarly, the set value of an interpolated gazing point position Gp is obtained by calculating an average value of the setting information values of the gazing point G(t) at the present time t and the gazing point G(t−1) at the previous time t−1. The set value of an interpolated rendering range Sp is obtained by calculating an average value of the setting information values of the rendering range S(t) at the present time t and the rendering range S(t−1) at the previous time t−1.

Next, the vertex interpolating portion 80 generates an interpolated vertex calculation result by interpolating vertexes between the present time t and the previous time t−1, and stores the interpolated vertex calculation result in the vertex calculation data storage section 50. The vertex interpolation for each model interpolates a vertex position for each corresponding vertex between the vertex calculation result at the previous time t−1 and the vertex calculation result at the present time t. When a vertex position is interpolated, the rotation of the model cannot be taken into consideration in linear interpolation. It is thus desirable to perform interpolation in which rotation is taken into consideration rather than linear interpolation. As for a normal vector tied to a texture pasting position and a vertex, it suffices to obtain an average value between the previous time t−1 and the present time t.

FIG. 7 is a diagram of assistance in explaining details of a vertex interpolating process. The values of a vertex position, a texture position, and a normal vector are obtained for each vertex of each model by a vertex calculating program specified from the game engine. An interpolated vertex calculation result at each interpolated vertex is obtained by applying interpolation to the set values of vertex positions, texture positions, and normal vectors at the present time t and the previous time t−1.

Specifically, interpolated values between a vertex position P(t), a texture position T(t), a normal vector N(t) of each of the vertexes v$0(t)$, v$1(t)$, and v$2(t)$ at the present time t and a vertex position P(t−1), a texture position T(t−1), a normal vector N(t−1) of each of the vertexes v$0(t-1)$, v$1(t-1)$, and v$2(t-1)$ at the previous time t−1 are obtained. Here, when interpolation is applied to the vertex position P(t) at time t and the vertex position P(t−1) at time t−1, the interpolation is performed with the rotation of the model M taken into consideration. The rotation of the model M at an intermediate point in time between the two times t and t−1 is calculated by a rotation matrix, and an interpolated vertex position Ps is obtained. On the other hand, an interpolated texture position Tp is an average value of the texture position T(t) and the texture position T(t−1) at the two times. Similarly, an interpolated normal vector Np is an average value of the normal vector N(t) and the normal vector N(t−1) at the two times.

When the model correspondence between the present time t and the previous time t−1 is not confirmed in step S22 (N in S22), the viewpoint setting instruction (t, M) at time t is executed to set an interpolated viewpoint (S28). This means that the viewpoint at time t is used as the interpolated viewpoint as it is. Next, an interpolated vertex result is generated according to the vertex calculating program (t, M) (S30). This means that the vertex calculation result at time t is used as the interpolated vertex result as it is.

The pixel calculating portion 40 generates an interpolated rendering result according to the pixel calculating program (t, M) on the basis of the interpolated vertex calculation result (S32).

One is added to the model number M (S34). When there is a model yet to be processed (N in S36), the process returns to step S12 to perform the rendering command interpolating process for the next model.

When the process is ended for all of the models (Y in S36), the vertex calculation result, the vertex data, and the viewpoint setting instruction retained at the previous time t−1 are overwritten with the vertex calculation result, the vertex data, and the viewpoint setting instruction at the present time t.

After the passage of an output synchronization time, the interpolated rendering result is output (S40). Then, after the passage of an output synchronization time, the rendering result (t) at time t is output (S42). This process can perform rendering at a high frame rate by virtually increasing frames while minimizing delay.

FIG. 8 is a diagram of assistance in explaining display timing. The game engine sets a rendering command in an interpolation processing program at time t, waits for a display update, and receives a notification of an end of the update from the interpolation processing program.

When the game engine has set the rendering command at time t in the interpolation processing program, the interpolation processing program generates a rendering result at time t and an interpolated rendering result from the rendering commands at the present time t and the previous time t−1. An interpolating process sets the interpolated rendering result in a display, and sets the rendering result at time t in the display after the passage of a display side synchronization period.

The display displays the interpolated rendering result set from the interpolation processing program until the passage of the display side synchronization period. After the passage of the display side synchronization period, the display displays the rendering result at time t.

Returning to FIG. 4, one is added to time t (S44). When a rendering stopping condition is not satisfied (N in S46), the process returns to step S10 to input a rendering command at a next time and perform the rendering command interpolating process for each model. When the rendering stopping condition is satisfied (Y in S46), the process is ended.

As described above, according to the rendering processing device 200 in accordance with the present embodiment, in a game application created in advance, on the basis of rendering commands specified from the game engine at a certain time interval, a rendering command at a different time within the time interval can be created by performing interpolation. On the basis of set values specified by rendering commands at a certain time t and a previous time t−1 and rendering results based on the rendering commands, a vertex position, a texture position, a normal vector, motion information, and the like can be obtained as intermediate vertex information at time tp between time t−1 and time t, and an interpolated rendering result can be generated.

The present embodiment can generate an image having a high frame rate by thus interpolating a rendering command. This enables video to be displayed at an optimum frame rate according to a platform without an existing game program being changed. When an image having a high frame rate is generated, interpolation is performed in a temporal direction of video on the basis of motion information and video of each model that are generated intermediately. Thus, the temporal resolution of the video can be improved at low cost.

In addition, in remote rendering in which a client receives rendering commands transmitted from a server and performs rendering, even when a loss occurs in the transmitted commands and thus rendering cannot be performed, the lost command can be reproduced virtually by the rendering command interpolating process.

The above description has been made of a case where the frame rate of a moving image is increased by the rendering command interpolating process. A few other processes used in combination with the frame rate increasing process will be described.

FIGS. 9A and 9B are diagrams of assistance in explaining a post antialiasing filter adaptive control process. When a vertex is obtained in the interpolating process, the slope of an edge connecting two vertexes to each other is obtained in a camera coordinate system.

FIG. 9A shows the position of vertexes v0, v1, and v2 at a certain time in the camera coordinate system. An edge connecting the vertexes v0 and v1 to each other has a slope of an angle θ1 with respect to the y-axis of the camera coordinate system. An edge connecting the vertexes v1 and v2 to each other has a slope of an angle θ2 with respect to the y-axis. FIG. 9B shows the position of the vertexes v0, v1, and v2 at another time. As compared with FIG. 9A, the vertexes v0 and v1 have not moved, and therefore the angle θ1 that the edge connecting the vertexes v0 and v1 to each other forms with the y-axis is not changed, whereas the vertex v2 has moved, and therefore the angle θ2 that the edge connecting the vertexes v1 and v2 to each other forms with the y-axis is changed. Thus a moving edge and a still edge are present in a vertex model.

Amounts of motion of the edges are obtained from amounts of movement of the vertex positions. An antialiasing filter is not applied to the moving edge. On the other hand, the antialiasing filter is applied to the still edge. At this time, in an antialiasing process, the filter is applied only to the edge along the direction of the edge.

In related art, a post antialiasing filter is uniformly applied to an entire image, thus causing a problem of blurring an area where aliasing does not easily occur, such as a texture or the like. Therefore strong antialiasing cannot be applied. On the other hand, a post antialiasing filter according to the present embodiment enables adaptive control to be performed as to whether or not the antialiasing filter is applied to an edge connecting vertexes obtained by the interpolating process to each other on the basis of direction information and motion information of the edge even when the frame rate increasing process is performed.

In addition, adaptive control can also be performed on the basis of characteristics of a terminal displaying an image, by for example not applying the antialiasing filter to a mobile telephone terminal or applying antialiasing to an organic EL display or a large-screen television display.

FIGS. 10A to 10C are diagrams of assistance in explaining a pixel-based frame interpolating process. In a situation in which the interpolation of a rendering command is difficult, such for example as a case where a model suddenly appears between the previous time t−1 and the present time t or a case where the number of vertexes of a model does not coincide, the interpolation of a rendering command is not performed, but is changed to a process of interpolating pixels using only motion information.

An amount of motion of each object is obtained from amounts of movement of vertex positions. For example, as shown in FIG. 10A, an amount of motion of a polygon is obtained by applying weighted interpolation to the amounts of motion of vertexes v0, v1, and v2. Next, an amount of motion in the whole of a rendered frame is obtained by superimposing the amount of motion of each object. Pixels are interpolated by performing an interpolating process between a rendered frame at the present time t which frame is shown in FIG. 10B and a rendered frame at the previous time t−1 which frame is shown in FIG. 10C on the basis of the amount of motion in the whole of the rendered frame.

When the rendering command interpolating process is difficult, the rendering command interpolating process is changed to the pixel-based frame interpolating process. Thereby a frame can be interpolated even when the interpolation of a rendering command is difficult, as in a case where a loss occurs in model data. This makes it possible to avoid a situation in which the frame rate cannot be increased when the rendering command interpolating process cannot be performed, and thus provide the rendering command interpolating process with an error tolerance.

In addition, even after the change is made to the frame interpolation, low-cost and accurate motion information can be obtained by using motion information of an intermediate result of rendering command interpolation. Therefore the image quality of a frame interpolation result is improved.

Figure 11:
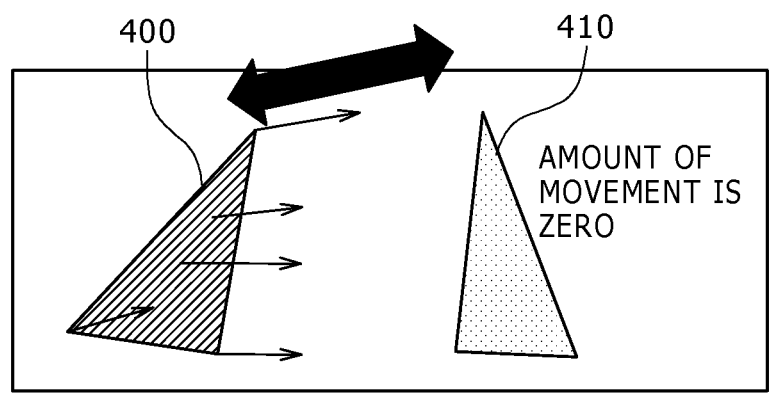
FIG. 11 is a diagram of assistance in explaining a motion blur adding process.

FIG. 11 is a diagram of assistance in explaining a motion blur adding process. An amount of motion of each object is obtained from amounts of movement of vertexes. In a camera coordinate system, an object 400 in FIG. 11 is moving, while an object 410 is still, with an amount of motion of the object 410 being zero. In this case, a blur component is added to the moving object 400 by applying a filter to the object 400 along a direction of motion of the object 400, whereas no blur component is added to the still object 410. At this time, the strength of the filter is adjusted according to a display frame rate.

The motion of an object can be tracked accurately by using a vertex interpolation result. It is thus possible to add a motion blur appropriately according to the motion of the model, and prevent unnatural motion due to an increase in frame rate.

In addition, ordinary rendering at a low frame rate has a problem of motion becoming jerky and conspicuous when video having a low frame rate is displayed on a display device having a fast response speed such as an organic EL display device or the like. Even when the display device has a fast response speed and display cannot be made at a high frame rate, motion can be prevented from being jerky by adding a motion blur to a moving area. On the other hand, the blurring process is not applied to a still part. Thus, clear display is made without the perceived sharpness of edges being lost.

FIG. 12 is a diagram of assistance in explaining an encoding process for each object. An amount of motion of each object is obtained from amounts of movement of vertexes. An image of each object is generated by performing a rendering process for each object on a server side. An encoded stream is generated by encoding the image and amount of motion of each object. Object superimposition information is generated as additional information of the encoded stream. The encoded stream of each object and the superimposition information are transmitted. A client side receives and decodes the plurality of streams, and superimposes the images of the decoded objects on each other on the basis of the superimposition information.

In the example of FIG. 12, an image of a moving object 400, an image of a still object 410, and superimposition information 420 for these objects are encoded separately from each other, and then transmitted. The receiving side decodes the stream of the image of the moving object 400, the encoded stream of the image of the still object 410, and the superimposition information 420, and superimposes the image of the moving object 400 and the image of the still object 410 on each other on the basis of the superimposition information.

An increase in frame rate is achieved for the moving object 400 by the rendering command interpolating process, and a total amount of code can be reduced by lowering the frame rate for the still object 410. By thus making choice as to whether to perform the rendering command interpolating process for each object using motion information and changing the frame rate according to the amount of motion of each object, the amount of code can be reduced as compared with a case where the frame rate increasing process is applied to an entire image.

In an ordinary encoding process, a motion vector is obtained, and image information is compressed between frames and within a frame according to the motion vector. At this time, the detection of the motion vector is a high-cost process, and presents a problem of a processing load. In addition, when a certain object is moving, many bits need to be allocated for representing the information of a boundary part between the certain object and another object, so that overall compression efficiency is decreased. On the other hand, an encoding process according to the present embodiment eliminates a need to allocate bits to an overlap portion between objects by performing encoding for each object on the basis of motion information and video of each object, and can therefore reduce a total amount of bits. Because an amount of motion is obtained by interpolating a rendering command, encoding for each object can be realized at low cost. An adjustment such for example as reducing a total amount of bits while maintaining subjective quality can also be made by incorporating a process of for example allocating a large number of bits to an important elemental portion disposed at the center of a screen, for example.

The present technology has been described above on the basis of embodiments thereof. The embodiments are illustrative, and it is to be understood by those skilled in the art that combinations of constituent elements and processing processes of the embodiments are susceptible of various modifications and that such modifications also fall within the scope of the present technology.

The present technology contains subject matter related to that disclosed in Japanese Priority Patent Application JP 2013-022652 filed in the Japan Patent Office on Feb. 7, 2013, the entire content of which is hereby incorporated by reference.

What is claimed is:

1. A rendering processing device comprising:
at least one microprocessor executing one or more computer programs in such a way that the rendering processing device carries out the actions of:
a rendering processing section configured to generate a vertex calculation result of an object, including vertex positions and attributes, on a basis of a rendering command, perform a rendering process on a basis of the vertex calculation result of each object, and store a rendering result in a rendering buffer; and
a rendering command interpolating section configured to generate an interpolated vertex calculation result of each object, including vertex positions and attributes, on a basis of set values of rendering commands and vertex calculation results of each object at two different times;
the rendering processing section performing the rendering process on a basis of the interpolated vertex calculation result, and storing an interpolated rendering result in the rendering buffer
wherein the rendering processing operates to display the rendering result and the interpolated rendering result in alternating fashion in order to increase a display quality perceived by a viewer,
wherein an application program being executed on an information processing device sets a frame rate, for displaying pixel data of the rendering results, to a reference frame rate, and
wherein the rendering processing device sets a rate at which the vertex calculation results of each object at two different times is not reduced from the reference frame rate, and a resultant frame rate of producing the rendering results is not reduced from the reference frame rate, such that a frame rate of displaying the rendering results and the interpolated rendering result is increased as compared to the reference frame rate.

2. The rendering processing device according to claim 1, wherein:
the rendering processing section includes:
a viewpoint setting portion configured to set a viewpoint according to a viewpoint setting instruction included in the rendering command,
a vertex calculating portion configured to generate the vertex calculation result of the object from vertex data included in the rendering command on a basis of the set viewpoint, and
a pixel calculating portion configured to calculate pixels from the vertex calculation result of each object on the basis of the set viewpoint, generate the rendering result, and store the rendering result in the rendering buffer;
the rendering command interpolating section includes:
a viewpoint interpolating portion configured to apply interpolation to two viewpoints set according to viewpoint setting instructions included in the rendering commands at the two different times, and
a vertex interpolating portion configured to obtain the interpolated vertex calculation result by applying interpolation to the vertex calculation results of the object at the two different times; and
the pixel calculating portion performs the rendering process on the basis of the interpolated vertex calculation result, and stores the interpolated rendering result in the rendering buffer.

3. The rendering processing device according to claim 1, wherein when object model correspondence between the two different times is not confirmed, the rendering processing section applies interpolation to pixels of frames at the two different times in place of an interpolating process by the rendering command interpolating section.

4. The rendering processing device according to claim 1, wherein the rendering processing section obtains a direction of an edge of the object and motion information of the edge on a basis of the vertex calculation result of the object, and applies, to the still edge, an antialiasing filter along the direction of the edge.

5. The rendering processing device according to claim 1, wherein the rendering processing section applies a filter for adding a blur component along a direction of motion of the object on a basis of the vertex calculation result of the object.

6. The rendering processing device according to claim 1, wherein the rendering processing operates to display the rendering result and the interpolated rendering result in alternating fashion in order to increase a display quality perceived by a viewer.

7. A rendering processing method comprising:
generating a vertex calculation result of an object, including vertex positions and attributes, on a basis of a rendering command, performing a rendering process on a basis of the vertex calculation result of each object, and storing a rendering result in a rendering buffer; and
generating an interpolated vertex calculation result of each object, including vertex positions and attributes, on a basis of set values of rendering commands and vertex calculation results of each object at two different times;
the rendering process being performed on a basis of the interpolated vertex calculation result; and
an interpolated rendering result being stored in the rendering buffer,
wherein the rendering process operates to display the rendering result and the interpolated rendering result in alternating fashion in order to increase a display quality perceived by a viewer,
wherein an application program being executed on an information processing device sets a frame rate, for displaying pixel data of the rendering results, to a reference frame rate, and
wherein the rendering processing device method sets a rate at which the vertex calculation results of each object at two different times is not reduced from the reference frame rate, and a resultant frame rate of producing the rendering results is not reduced from the reference frame rate, such that a frame rate of displaying the rendering results and the interpolated rendering result is increased as compared to the reference frame rate.

8. The rendering processing method according to claim 7, wherein:
the step of generating the vertex calculation result includes:
setting a viewpoint according to a viewpoint setting instruction included in the rendering command,
generating the vertex calculation result of the object from vertex data included in the rendering command on a basis of the set viewpoint, and
calculating pixels from the vertex calculation result of each object on the basis of the set viewpoint, generate the rendering result, and store the rendering result in the rendering buffer;
the step of generating an interpolated vertex calculation result includes:
applying interpolation to two viewpoints set according to viewpoint setting instructions included in the rendering commands at the two different times, and
obtaining the interpolated vertex calculation result by applying interpolation to the vertex calculation results of the object at the two different times; and
performing the rendering process on the basis of the interpolated vertex calculation result, and storing the interpolated rendering result in the rendering buffer.

9. The rendering processing method according to claim 7, wherein when object model correspondence between the two different times is not confirmed, the step of generating the vertex calculation result includes applying interpolation to pixels of frames at the two different times in place of an interpolating process by the rendering command interpolating section.

10. The rendering processing method according to claim 7, wherein the step of generating the vertex calculation result includes obtaining a direction of an edge of the object and motion information of the edge on a basis of the vertex calculation result of the object, and applying, to the still edge, an antialiasing filter along the direction of the edge.

11. The rendering processing method according to claim 7, wherein the step of generating the vertex calculation result includes applying a filter for adding a blur component along a direction of motion of the object on a basis of the vertex calculation result of the object.

12. The rendering processing method according to claim 7, wherein the rendering includes displaying the rendering result and the interpolated rendering result in alternating fashion in order to increase a display quality perceived by a viewer.

13. A non-transitory, computer readable storage medium containing a rendering processing program, which when executed by a computer causes the computer to execute actions, comprising:
generating a vertex calculation result of an object, including vertex positions and attributes, on a basis of a rendering command, performing a rendering process on a basis of the vertex calculation result of each object, and storing a rendering result in a rendering buffer; and
generating an interpolated vertex calculation result of each object, including vertex positions and attributes, on a basis of set values of rendering commands and vertex calculation results of each object at two different times;
the rendering process performing the rendering process on a basis of the interpolated vertex calculation result, and storing an interpolated rendering result in the rendering buffer,
wherein the rendering process operates to display the rendering result and the interpolated rendering result in alternating fashion in order to increase a display quality perceived by a viewer,
wherein an application program being executed on an information processing device sets a frame rate, for displaying pixel data of the rendering results, to a reference frame rate, and
wherein the rendering processing device method sets a rate at which the vertex calculation results of each object at two different times is not reduced from the reference frame rate, and a resultant frame rate of producing the rendering results is not reduced from the reference frame rate, such that a frame rate of displaying the rendering results and the interpolated rendering result is increased as compared to the reference frame rate.

* * * * *